United States Patent Office 2,832,924
Patented Apr. 29, 1958

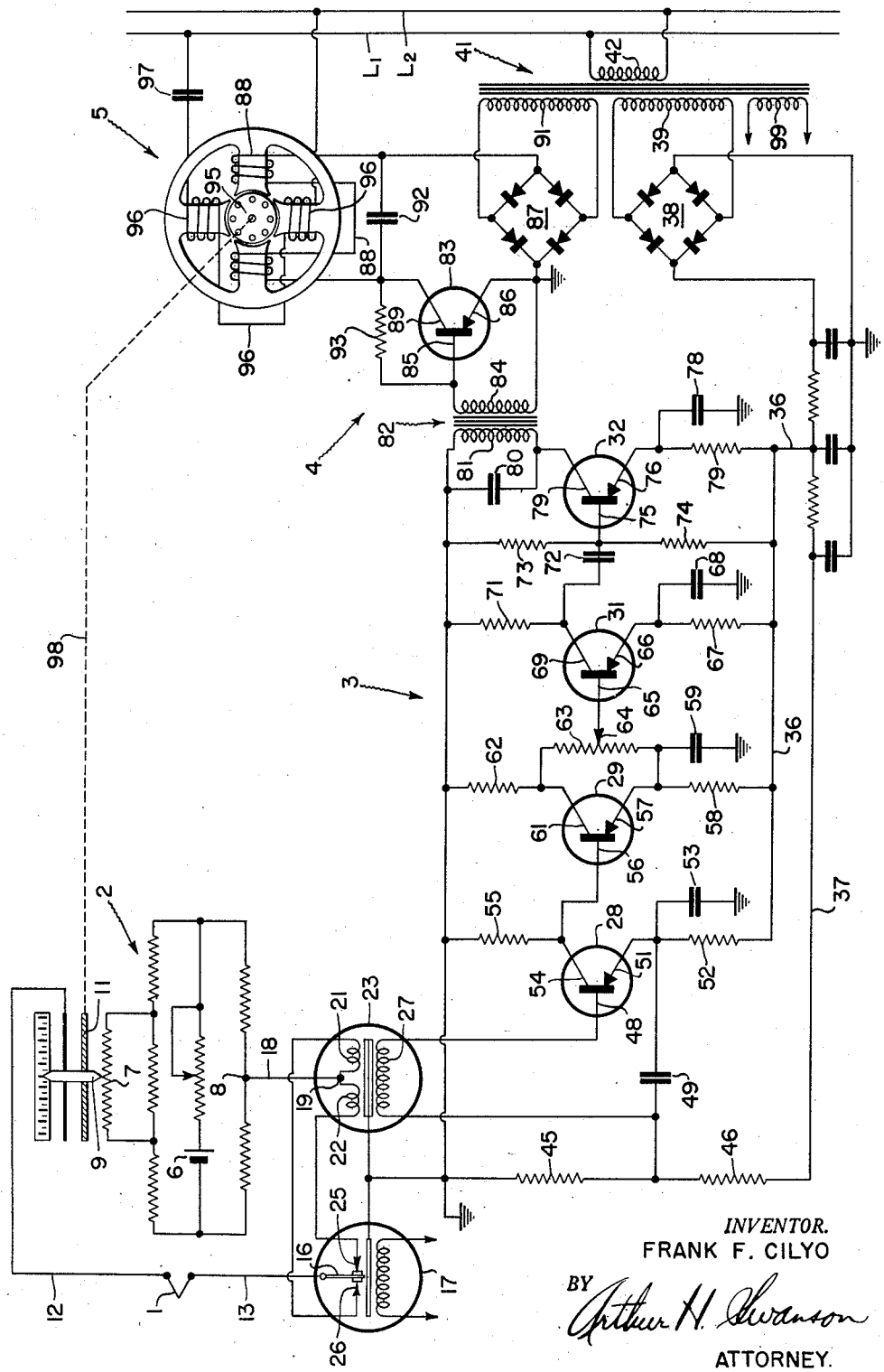

2,832,924

ELECTRICAL MEASURING AND/OR CONTROL SERVOSYSTEM

Frank F. Cilyo, Levittown, Pa., assignor to Minneapolis-Honeywell Regulator Company, Minneapolis, Minn., a corporation of Delaware Application August 17, 1955, Serial No. 528,939

10 Claims. (Cl. 318—28)

A general object of the present invention is to provide a new and improved measuring and/or control apparatus. More specifically, the present invention is concerned with a new and improved self-balancing potentiometer apparatus utilizing a transistor signal amplifier and a reversible motor drive circuit.

Generally, in self-balancing potentiometers a measuring circuit unbalance is amplified by means of an electronic amplifier which is operative to impress upon the input of a motor drive circuit a signal, varying in magnitude and phase, in accordance with the magnitude and direction of the unbalance. The motor drive circuit, in turn, operates in accordance with the magnitude and phase of that signal to selectively energize a motor for rotation in the direction and to the extent necessary to rebalance the measuring circuit.

In adapting a transistor type amplifier into a self-balancing measuring apparatus, several problems arise. One such problem is the problem of making the amplifier temperature stable without materially affecting the overall circuit gain or the loop stability of the complete apparatus. In the motor drive circuit, it is essential that the controlled motor be driven when there is an unbalance signal and effectively stopped in the absence of such a signal. The use of a motor drive transistor requires special circuitry which will permit a direct current braking signal to flow through the motor control winding in the absence of an unbalance signal, to provide such motor braking and thereby prevent undesirable hunting. This special circuitry must not interfere with the temperature stability of the circuit. In addition, there is a need for a gain or sensitivity adjustment which will likewise be effective without upsetting the temperature stability or loop stability of the apparatus.

It is therefore a further object of the present invention to provide a transistorized amplifier and motor drive circuit integrated into an overall system designed to provide effective motor control for the rebalancing operation in a system of the type described.

Still another object of the present invention is to provide a new and improved motor drive circuit utilizing a transistor capable of driving a reversible electric motor in a rebalancing operation without overshooting the point of system balance and subsequently hunting.

A further object of the present invention is to provide a reliable and temperature stable measuring system utilizing a transistor amplifier having a minimum size, low power consumption, and long life.

The various features of novelty which characterize this invention are pointed out with particularity in the claims annexed to and forming part of this specification. For a better understanding of this invention, its advantages, and the specific objects attained with its use, reference should be had to the accompanying drawing and descriptive matter in which is illustrated and described a preferred embodiment of this invention.

Referring now to the single drawing there is shown an embodiment of the present invention adapted to measure the output of a thermocouple 1. Changes in the output of the thermocouple 1 unbalance a potentiometer measuring circuit 2. This unbalance is amplified by means of an electronic amplifier 3 which is operative to impress upon the input of a motor drive circuit 4 a signal, varying in magnitude and phase, in accordance with the magnitude and direction of the unbalance. The motor drive circuit 4, in turn, operates selectively, in accordance with the phase and magnitude of the signal, to energize a rebalancing motor 5, driving it in a direction and to the extent necessary to rebalance the measuring circuit 2.

The measuring circuit 2 comprises two resistive branch circuits connected in parallel across an energizing circuit. The energizing circuit includes a source of unidirectional voltage, shown here as a battery 6. One of the resistive branch circuits includes a slidewire resistor 7 and the other resistive branch circuit includes a circuit point 8 between a pair of resistors connected in series with one another. A sliding contact 9 engages the slidewire 7 and is adjustable along the length of the latter by the rotation of an adjusting element 11.

The thermocouple 1 is connected by means of a conductor 12 to the sliding contact 9 and is connected by means of a conductor 13 to a polarized vibrating reed 16 of a converter reed 17. The circuit point 8 is connected by means of a conductor 18 to a common terminal 19 of a pair of primary winding sections 21 and 22 of an input transformer 23. The converter 17 includes a winding 24 energized by alternating current to cause the polarized vibrating reed 16 to vibrate with the frequency of the alternating current impressed on the winding 24. As the reed 16 vibrates back and forth, under the influence of the winding 24, it alternately engages a pair of contacts 25 and 26. The contact 25 is connected to the end terminal of the primary winding section 22 of the input transformer 23 and the contact 26 is connected to the end terminal of the primary winding section 21 of the input transformer 23. The input transformer 23 has a secondary winding 27 which is connected to the emitter-base circuit of the transistor in the first stage of the amplifier 3.

The amplifier 3 is a four stage transistor amplifier employing the transistors 28, 29, 31, and 32 as its amplifying elements. The transistors 28, 29, 31, and 32 are pnp type transistors but it should be understood that they could also be npn junction type transistors with suitable changes in the various circuit parameters having the usual emitter, collector, and base electrodes. The amplifier 3 is energized with direct current from a power supply 35 by means of a pair of conductors 36 and 37. The power supply 35 includes a full wave bridge rectifier 38 which has its input terminals connected across a secondary winding 39 of a transformer 41. The transformer 41 has a primary winding 42 which is connected across a suitable source of alternating current, the conductors $L_1$ and $L_2$. As shown, suitable ripple filtering circuits are connected across the output terminals of the bridge rectifier 38.

A pair of resistors 45 and 46, connected between the power supply 35, by means of the conductor 37, and the grounded conductor 47, form a base stabilizing voltage divider for the transistor 28 of the first amplifier stage. The base 48 of the transistor 28 is connected to the junction of the resistors 45 and 46 by the secondary winding 27 of the input transformer 23. The junction of the resistors 45 and 46 and hence one end terminal of the input transformer 27 is connected to the emitter 51 of the transistor 28 by means of a capacitor 49. The emitter 51 of the transistor 28 is connected to the conductor 36 by means of a resistor 52 which is bypassed to ground by means of a capacitor 53. The collector 54 of the transistor 28 is connected to the grounded conductor 47 by means of a resistor 55. The collector 54 of the transistor 28 is also directly coupled to the base 56 of the transistor 29. The emitter 57 of the transistor 29 is connected to the conductor 36 by means of a resistor 58. The resistor 58 is bypassed to ground by means of a capacitor 59. The collector 62 of the transistor 29 is connected to the grounded conductor 47 by means of a resistor 62. A gain control potentiometer 63 is connected directly between the collector 61 and the emitter 57 of the transistor 29. A sliding contact 64 on the potentiometer 63 is connected directly to the base 65 of the transistor 31. The emitter 66 of the transistor 31 is connected to the conductor 36 by means of a resistor 67 which is bypassed to ground by means of a capacitor 68. The collector 69 of the transistor 31 is connected to the grounded conductor 47 by means of a resistor 71. The collector 69 of the transistor 31 is coupled by means of a capacitor 72 to the junction of a pair of resistors 73 and 74 which form a base stabilizing voltage divider connected between the conductors 36 and 47. The base 75 of the transistor 32 is connected to the junction of the resistors 73 and 74. The emitter 76 of the transistor 32 is connected by means of a resistor 77 to the conductor 36. The resistor 77 is bypassed to ground by means of a capacitor 78. The collector 79 of a transistor 32 is connected through the primary winding 81 of the coupling transformer 82 to the conductor 47. As shown, the secondary winding 81 of the transformer 82 is bypassed by means of a capacitor 80 and forms therewith a parallel resonant circuit which filters out noise originating in earlier amplifier stages.

The transformer 82 is employed to couple the output of the amplifier 3 to the input of the motor drive circuit 4. The motor drive circuit 4 employs the pnp junction transistor 83 as its amplifying element. As shown, the secondary winding 84 of the coupling transformer 81 is connected between the base 85 and the emitter 86 of the transistor 83. The output terminals of a bridge rectifier 87 are connected in series with the motor control winding 88 of the two phase reversible induction motor 5 between the emitter 86 and the collector 89 of the transistor 83. The bridge rectifier 87 and a secondary winding 91 of the transformer 41 comprise a separate direct current power supply for the motor drive circuit 4. A condenser 92 is connected in parallel with the motor control winding 88. The condenser 92 is selected with respect to the motor control winding 88 so as to form therewith a substantially parallel resonant circuit at the frequency of motor operation. A resistor 93 is connected between the collector 89 and the base 85 of the transistor 83.

In addition to the motor control winding 88, the two phase reversible induction motor 5 includes a rotor 95 and a power winding 96. The power winding 96 of the reversible motor 5 is connected in series with a condenser 97 across the alternating current conductors $L_1$ and $L_2$. The condenser 97 is selected with respect to the power winding 96 so as to form therewith a substantially series resonant circuit at the frequency of the alternating current in the conductors $L_1$ and $L_2$. The rotor 95 of the rebalancing motor 5 is operative through the linkage 98 and the adjusting element 11 to position the sliding contact 9 along the length of the slidewire resistor 7 of the measuring circuit 2.

In considering the operation of the self-balancing potentiometer measuring apparatus of Fig. 1, the voltage across the conductors $L_1$ and $L_2$ will be considered as the reference voltage. The direction of rotation of the two phase reversible induction motor 5 depends upon the phase relationship between the current in the motor power winding 96 and the current in the motor control winding 88. If the current in the control winding leads the current in the power winding by approximately 90° the motor will turn in one direction. If, on the other hand, the current in the control winding lags the current in the power winding by approximately 90°, the motor 5 will turn in the other direction. As mentioned above, the motor power winding 96 is connected in series with the condenser 97 across the alternating current conductors $L_1$ and $L_2$. In operation, the power winding 96 is continuously energized by current from the conductors $L_1$ and $L_2$. As a result of the series resonant circuit formed by the capacitor 97 and the motor power winding 96, the current in the power winding 96 is substantially in phase with the voltage across the conductors $L_1$ and $L_2$. Due to the action of the condenser 92 connected in parallel with the motor control winding 88, the current flowing in the control winding 88 lags the voltage across this winding by 90°.

When the measuring apparatus of Fig. 1 is unbalanced by a change in the output voltage of the thermocouple 1, current is caused to flow in the circuit comprising the thermocouple 1, the conductor 13, the vibrating reed 16, the contacts 25 and 26, the input transformer primary winding sections 21 and 22, the conductor 18, and the bridge circuit connected between the slidewire contact 9 and the circuit point 8. When such unbalance occurs, the rebalancing motor 5 is energized for rotational operation and adjusts the slider contact 9 in the direction and to the extent necessary to restore the equality of voltage of the thermocouple and the potential drop across the bridge circuit between the circuit point 8 and the slidewire point engaged by the slider 9. While the apparatus is unbalanced, the direction of current flow through the thermocouple is in one direction or the other as the thermocouple voltage exceeds or is less than the voltage drop across the bridge circuit.

When current flows through the thermocouple circuit, the operation of the converter 17 causes current pulses to flow alternately through the transformer primary winding sections 21 and 22. When the voltage unbalance is in one direction, the current pulses pass through each of the winding sections 21 and 22 toward the common terminal 19 and the conductor 18. When the unbalance is in the opposite direction, the current flow through the winding sections 21 and 22 is in the direction away from the common terminal 19. The alternating current induced in the transformer secondary winding is in phase or 180° out of phase with the current flowing depending upon the construction of the apparatus. The phase of the current induced in the winding 27 is reversed, or shifted 180° by the reversal of the direction of current flow through the transformer winding sections 21 and 22. Due to the construction of the converter 17 and since the voltage across the winding 24 is derived from a secondary winding 99 of the transformer 41, the reed 16 vibrates at the frequency of and approximately in phase with the voltage across the conductors $L_1$ and $L_2$.

The unbalance voltage, in phase or 180° out of phase with the reference voltage, induced in the transformer secondary winding 27 of the input transformer 24 is amplified by means of the electronic amplifier 3. The alternating current signal applied by the input transformer 24 across the emitter base circuit of the transistor 28 varies the emitter base voltage and thus the transistor base current. The small variations in base current thereby obtained cause relatively large changes in the collector current flowing through the collector circuit resistor 55. This in turn causes a larger variation in the base current of the transistor 29 thereby effecting a still larger increase in that transistor's collector current. This process of current amplification is repeated in succeeding stages with the amplifier output appearing across the secondary winding 84 of the inter-stage transformer 81.

In considering the operation of the motor drive circuit 4 the effect of the resistor 93 will be, for the moment, disregarded and will be explained in detail below. When no current flows through the thermocouple circuit, indicating no temperature change, there is no alternating current signal impressed upon the input of the motor drive circuit 4. Because the transistor 83 is not provided with emitter base bias, its operation can be considered to be in the class B mode. For the purpose of this explanation, it will be assumed that when there is a temperature decrease the base 85 of the transistor 83 will be negative with respect to the emitter 86 during the first half cycle of the voltage under consideration. This negative signal on the base of the transistor 83 will cause the collector current of the transistor to increase and a current will flow from the positive terminal of the bridge rectifier 87 through the emitter-collector circuit of the transistor 83 and the motor control winding 88 to the negative terminal of the bridge rectifier 87. During the next half cycle of the control signal, the base electrode 85 of the transistor 83 will be positive with respect to the emitter 86. This positive signal on the base of the transistor 83 will effectively cut off the flow of collector current during this half cycle. However, due to the action of the condenser 92, connected in parallel with the motor control winding 88, the current flow through the motor control winding 88 will appear as a 60 cycle alternating current which leads the current through the motor power winding 96 by approximately 90°. This will cause rotation of the rotor 85 in the direction necessary to adjust the sliding contact 9 on the slidewire 7 to restore the balance of the voltages of the thermocouple 1 and the potential drop of the bridge circuit between the circuit point 8 and the slidewire point engaged by the slider 9.

When there is a temperature decrease, the base electrode 85 of the transistor 83 will be positive with respect to the emitter 86 during the first half cycle of the reference voltage under consideration. This will prevent any collector current from flowing during this half cycle. During the next half cycle of the control signal, the base electrode 85 of the transistor 83 will be negative with respect to the emitter 86. The negative signal on the base of the transistor 83 will cause an increase in collector current flow. Thus, current will flow from the positive terminal of the bridge rectifier 87 through the emitter-collector circuit of the transistor 83 and the motor control winding 88 to the negative terminal of the bridge rectifier 87. Again, due to the action of the condenser 92 the current which flows through the motor control winding 88 will appear as a 60 cycle alternating current. This current will lag the current through the motor power winding 96 by approximately 90°. This causes the rebalancing motor to adjust the slider contact 9 in the direction and to the extent necessary to restore the equality of voltage of the thermocouple 1 and the potential drop across the bridge circuit between the circuit point 8 and the slidewire point engaged by the slider 9.

The effect of the resistor 93 on motor drive circuit operation is three fold. The resistor 93 provides a D. C. current path through the motor control winding 88 to the coupling transformer secondary winding 84 when the transistor 83 is in a non-conductive state as it is in the absence of an error signal. The D. C. current thus permitted to flow provides viscous damping from the motor. This damping results from the current induced in the rotor bars when they cut the field produced by the D. C. current flowing in the motor control 88. The induced current acts on the rotor to prevent rotor rotation.

The resistor 96 also provides A. C. feedback which stabilizes the current gain of the transistor 83. In transistors current gain generally decreases as the current input to the transistor base increases. The A. C. signal feedback provided by the resistor 93 substantially linearizes the current gain characteristics of the motor driving transistor 83 thereby insuring effective motor drive over large signal ranges.

Another effect of the A. C. feedback provided by the resistor 93 is that of decreasing the output impedance and increasing the input impedance of the transistor 83. This tends to improve power transfer both to the transistor and to the motor. By a proper selection of the value of the resistor 93, the loss of transistor power gain can be held to less than 10% which loss is more than offset by the improved performance obtained with its use.

The amplifier 3 comprises a three stage direct coupled signal amplifier and a fourth capacitor coupled driving stage. The signal amplifier is designed to provide relatively high power gain and good temperature stability. As shown, the base of the transistor 28 of the first amplifier stage is specially biased by means of the voltage divider formed by the resistors 45 and 46. This special voltage divider is provided so that the impedance of the input transformer secondary winding 27 can be matched by the input impedance of the transistor 28. The voltage divider formed by the resistors 45 and 46 is energized from the power supply 35 through an additional ripple filtering section to provide low noise when the system is operated in the microvolt region.

The direct coupling of the first three amplifier stages achieves several desirable results other than the obvious simplification of circuitry and the elimination of extra components. The effect of temperature upon transistors is particularly manifested by an increase in the zero emitter collector current, $I_{co}$. This current increases exponentially with an increase in temperature. With the amplifier stages direct coupled, any change in the $I_{co}$ of one transistor stage will be cancelled out in the collector circuit resistor of that stage by a similar change in the zero emitter-collector current of the next stage. This prevents the cascading of the effects of such changes. The direct coupling of the amplifier stages also tends to minimize the effective differences in the parameters of the individual transistors employed. For example, the grounded emitter amplifier stage has a comparatively low input impedance and a high output impedance. When two such stages are coupled to each other the impedance mismatch is of such magnitude with respect to the internal impedance differences in individual transistors that it tends to minimize such differences.

The novel gain control provided by the potentiometer resistor 63 is also of interest. If the resistance of the resistor 63 is made large in comparison with the collector resistor 62 of the transistor 29, the adjustment of the sliding contact 64 does not affect the gain of the second amplifier stage or markedly change the bias of the following stage. At the minimum setting of the resistor 62, the bias of the third amplifier stage is increased by the value of the bias of the second amplifier stage. Since transistors are basically current amplifying devices the gain control in a transistor amplifier should provide a division of the current signal in a manner similar to the voltage division achieved by gain controls used in vacuum tube amplifiers. The potentiometer resistor 63 connected directly between the collector 61 and the emitter 57 of the transistor 29 provides current division for the signal into the base 65 of the transistor 31 of the third amplifier stage.

In general, the purpose of the driver stage is to accept low power signals at a medium impedance level and to amplify and feed the signal into the motor drive stage at a high current and low impedance level. By providing the separate biasing voltage divider for the fourth stage of the amplifier 3, the impedance of the transistor 83 can be appropriately matched with the impedance presented by the coupling transformer 82. Thus, by appropriately optimizing the operating conditions of the transistor 32 by the use of a separate bias voltage divider it is possible to use a transistor with a lower power dissipation rating than could be used without the separate biasing means.

While, in accordance with the provisions of the statutes, there has been illustrated and described the best form of the invention now known, it will be apparent to those skilled in the art that changes may be made from the form of the apparatus disclosed without departing from the spirit of the invention as set forth in the appended claims, and that in some cases certain features of the invention may be used to advantage without a corresponding use of other features.

Having now described this invention, what is claimed as new and for which it is desired to secure by Letters Patent is:

1. In combination, a transistor having an emitter, a collector, and a base, a two phase reversible induction motor having a control winding and a power winding, a source of energizing voltage, means connecting the control winding of said motor and said energizing voltage source in series between the emitter and collector of said transistor, an input circuit connected to the base and emitter of said transistor and a resistor connected directly between the base and collector of said transistor.

2. In combination, a two phase reversible induction motor having a control winding and a power winding, the power winding being adapted to be connected to a source of alternating current of substantially fixed phase and magnitude, a transistor for controlling the magnitude of the current in the control winding, said transistor having an emitter, a collector, and a base, an input circuit connected between the transistor emitter and base and adapted to be connected to a signal source having a reversible phase with respect to said alternating current source, a source of direct current, circuit means connecting the emitter and collector of said transistor in series with the source of direct current and said motor control winding, and a feedback resistor connected directly between the transistor collector and base.

3. A circuit comprising a transistor having an emitter, a collector, and a base, a source of direct current for energizing said transistor, a reversible electric motor having a control winding and a power winding, the power winding being adapted to be connected, through a condenser, to a source of alternating current, circuit means connecting the collector and emitter of said transistor in a series circuit with the source of direct current and the motor control winding, a condenser connected across said control winding, an input circuit connected between the emitter and base of said transistor and a motor damping and transistor gain stabilizing feedback path connected directly between the transistor base and collector.

4. In combination with a reversible two phase induction motor having a power winding and a control winding, circuit means connecting the power winding to a source of alternating reference voltage and operative to shift the phase of the current in said power winding with respect to said reference voltage by approximately 90°, a transistor having an emitter, a collector, and a base, a source of direct current, circuit means connecting the source of direct current and the control winding of said motor in series to the emitter and collector of said transistor, a condenser connected in parallel across the control winding of said motor and operative to tune it to resonance at the frequency of motor operation, a resistive feedback path connected between the transistor collector and base, and an input transformer adapted to receive a signal of a variable magnitude and of a reversible phase with respect to the phase of said reference voltage, the secondary winding of said transformer being connected directly to the emitter and base of said transistor.

5. In combination, circuit means for producing an alternating current signal having a magnitude and phase proportional to the magnitude and direction of a condition being measured, said means including a rebalancing element, an amplifier having an input and an output, circuit means connecting said first mentioned means to the input of said amplifier, a transistor having an emitter, a collector, and a base, a two phase reversible induction motor having a control winding and a power winding, a source of energizing voltage, means connecting the control winding of said motor and said energizing voltage source in series between the emitter and collector of said transistor, an input circuit connected to the base and emitter of said transistor, and a resistor connected directly between the base and collector of said transistor, the output of said amplifier being connected to the input circuit of said transistor, and mechanical means operatively connecting said motor to said rebalancing means.

6. A motor control system comprising in combination an amplifier adapted to receive a signal having a magnitude and phase proportional to the magnitude and direction of desired motor rotation, said amplifier comprising three direct coupled transistor amplifying stages and a fourth capacitor coupled transistor driver stage, a direct current power supply for said amplifier including filtering means, separate biasing means for the transistor in the first amplifier stage, additional filtering means for said biasing means, separate biasing means for the driver stages, and a coupling transformer having its primary winding connected in the output of said driver stage, a two phase reversible induction motor having a control winding and a power winding, the power winding being adapted to be connected to a source of alternating current of substantially fixed phase and magnitude, a transistor for controlling the magnitude of the current in the control winding, said transistor having an emitter, a collector, and a base, the secondary winding of said coupling transformer being connected between the transistor emitter and base and adapted to be connected to a signal source of a reversible phase with respect to said alternating current source, a source of direct current, circuit means connecting the emitter and collector of said transistor in series with the source of direct current and said motor control winding, and a feedback resistor connected directly between the transistor collector and base.

7. A motor control system comprising in combination an amplifier adapted to receive a signal having a magnitude and phase proportional to the magnitude and direction of desired motor rotation, said amplifier comprising four transistors connected in the common emitter configuration, three of said transistors forming amplifying stages and the fourth forming a driver stage, a direct current power supply for said amplifier, separate base biasing means for the first and fourth stages of said amplifier, and gain control means connected directly between the emitter and collector of the transistor in the second amplifier stage and to the base of the transistor in the third amplifier stage, a motor drive circuit comprising a transistor having an emitter, a collector, and a base, a source of direct current for energizing said transistor, a reversible electric motor having a control winding and a power winding, the power winding being adapted to be connected, through a condenser, to a source of alternating current, circuit means connecting the collector and emitter of said transistor in a series circuit with the source of direct current and the motor control winding, a condenser connected across said control winding, coupling means connected between the emitter and base of said transistor to couple it to said driver stage of the amplifier, and a motor damping and transistor gain stabilizing feed back path connected directly between the transistor base and collector.

8. A self-balancing measuring and control apparatus comprising in combination balanceable means for producing an alternating current signal having a magnitude and phase proportional to the magnitude and direction of a change in the condition being measured or controlled, amplifying means for amplifying said signal, a transistor having an emitter, a collector, and a base, a two phase reversible induction motor having a control winding and a power winding, a source of energizing voltage, means connecting the control winding of said motor and said energizing voltage source in series between the emitter and collector of said transistor, an input circuit connected to the base and emitter of said transistor, a resistor connected directly between the base and collector of said transistor, means for coupling the output of said supplying means to the input circuit of said transistor, and means connecting said motor to said balanceable means.

9. A motor control circuit for a two phase reversible induction motor having a power winding and a control winding, said power winding being adapted to be energized from a source of alternating current of substantially fixed phase and magnitude, a source of direct current, a series path for the direct current from said source comprising said direct current source, the motor control winding, a resistor and the secondary winding of a transformer, means for modulating the direct current flowing in the motor control winding comprising a transistor having its emitter-collector circuit connected in shunt across said motor control winding and said direct current source, and circuit means connecting the emitter-base circuit of said transistor across said transformer secondary winding, the primary winding of said transformer being adapted to receive a signal of variable magnitude and of a reversible phase with respect to said first mentioned alternating current source.

10. In combination, circuit means for producing an alternating current signal having a magnitude and phase proportional to the magnitude and direction of a condition being measured, said means including a rebalancing element, an amplifier having an input and an output, circuit means connecting said first mentioned means to the input of said amplifier, a two phase reversible induction motor having a power winding, a control winding, said power winding being adapted to be energized from a source of alternating current of substantially fixed phase and magnitude, a source of direct current, a series path for the direct current from said source comprising said direct current source, the motor control winding, a resistor, and the secondary winding of a transformer, means for modulating the direct current flowing in the motor control winding comprising a transistor having its emitter-collector circuit connected in shunt across said motor control winding and said direct current source, and circuit means connecting the emitter-base circuit of said transistor across said transformer secondary winding, the primary winding of said transistor being coupled to the output of said amplifier, and said motor being mechanically connected to said rebalancing element.

References Cited in the file of this patent

UNITED STATES PATENTS 2,695,381     Darling _____ Nov. 23, 1954